3,057,934
REACTION PRODUCT OF SULFUR DICHLORIDE SUBSTITUTED DIAMINES AND A QUINOLINE AND A COMPOSITION OF SAID PRODUCT AND RUBBER
Richard W. Kibler, Cuyahoga Falls, Ohio, assignor to The Firestone Tire & Rubber Company, Akron, Ohio, a corporation of Ohio
No Drawing. Filed Jan. 15, 1960, Ser. No. 2,595
16 Claims. (Cl. 260—800)

This invention relates to mixed sulfides of (1) N,N'-diphenyl-para-phenylenediamine or a methyl derivative thereof, (2) a more soluble N,N'-di-substituted p-phenylenediamine, and (3) 2,2,4-trimethyl-1,2-dihydroquinoline or a 6-alkyl or 6-alkoxy derivative thereof. The invention includes the use of the mixed sulfides in rubber as antioxidants and flex-cracking inhibitors, and includes also the resulting rubber products.

N,N'-diphenyl-para-phenylenediamine and derivatives thereof containing one or two methyl groups are known to have good anti-flex-cracking properties but they are relatively insoluble in rubber, and bloom from the vulcanizate. The mixed sulfides are good flex-cracking inhibitors and are more soluble in rubber than N,N'-diphenyl-p-phenylenediamine and said methyl derivatives and will not bloom when used in higher concentrations than are possible with N,N'-diphenyl-p-phenylenediamine and its said methyl derivatives.

The N,N'-diphenyl-p-phenylenediamine may be substituted or it may contain either one or two methyl groups in any ring position. Thus, the compound may be—

N,N'-diphenyl-p-phenylenediame
N,N'-diphenyl-p-toluylenediamine (any isomer)
N,N'-diphenyl-2,5-dimethyl-p-phenylenediamine
N,N'-diphenyl-2,6-dimethyl-p-phenylenediamine
N,N'-ditolyl-p-phenylenediamine (any isomer)
N-phenyl-N'-tolyl-p-phenylenediamine (any isomer)
N-phenyl-N'-tolyl-p-toluylenediamine (any isomer)
N-phenyl-N'-xylyl-p-phenylenediamine (any isomer)

Thus, this component (referred to herein as the less soluble phenylenediamine) is defined as from the class consisting of N,N'-diphenyl-phenylenediamine and mono- and dimethyl ring substituted derivatives thereof.

The 2,2,4-trimethyl-1,2-dihydroquinone may be unsubstituted or substituted in the 6-position by an alkyl or alkoxy group containing 1 to 20 carbon atoms. The following list of substituents is illustrative:

Methyl
Ethyl
Pentyl
Octyl
Dodecyl
Ethoxy
Methoxy
Propoxy
Butoxy
Dodecyloxy
Hexadecyloxy The more soluble p-phenylenediamine may contain any number of methyl or ethyl substituents in the ring and there is at least one substituent in each amino group of the p-phenylenediamine. The substituents in the amino groups may be the same or different. One of the amine substituents may, for example, be phenyl, biphenyl, tolyl, xylyl or naphthyl; one or more may be a cycloalkyl group such as cyclohexyl, cyclopentyl, etc.; one or more may be an alkyl group of 1 to 12 carbon atoms. Illustrative of these more soluble p-phenylenediamines are:

N-phenyl-N'-cyclohexyl-p-phenylenediamine
N-phenyl-N'-cyclohexyl-p-tolylenediamines
N-xylyl-N'-ethyl-p-phenylenediamines
N-phenyl-N'-cyclohexyl-p-ethylphenylenediamines
N-biphenyl-N'-methyl-p-phenylenediamine
N-tolyl-N'-cyclohexyl-p-phenylenediamines
N-phenyl-N'-ethyl-p-phenylenediamine
N-naphthyl-N'-pentyl-p-phenylenediamine
N-phenyl-N'-amyl-p-tolylenediamines
N,N'-dinaphthyl-p-phenylenediamine
N,N'-dimethyl-p-phenylenediamine
N,N'-dioctyl-p-phenylenediamine
N,N'-didodecyl-p-tolylenediamines
N-methyl-N'-undecyl-p-phenylenediamine
N-ethyl-N'-decyl-p-phenylenediamine
N,N'-dixylyl-p-phenylenediamines
N-cyclohexyl-N'-nonyl-p-phenylenediamine
N-cyclopentyl-N'-octyl-p-tolylenediamines
N,N'-di-sec-butyl-p-phenylenediamine The mixed sulfides are formed by reacting with sulfur dichloride, $SCl_2$, and the reaction products may be formed by reacting one mol of the less soluble phenylenediamine, one or two mols of the more soluble phenylenediamine, and one-half to two mols of the substituted dihydroquinoline with that number of mols of sulfur dichloride which is equal to the sum of the mols of the other reactants minus one.

The reaction products include relatively low molecular weight products containing no more than one or two molecules derived from each reactant. One or both terminal groups are formed by the dihydroquinoline derivative, and there is no internal dihydroquinoline derivative group. In the chains of these compounds, the less soluble phenylenediamine and the more soluble phenylenediamine recur at more or less frequent intervals and there is a sulfur atom between each two of the other groups. Representing the dihydroquinoline derivatives by A and the different classes of phenylenediamine derivatives by B and C, the reaction products include compounds of the types illustrated by the following formulae; but applicant is not necessarily limited thereto and does not wish to be bound thereby.

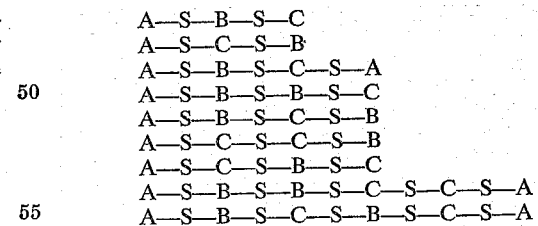

The mixed sulfide reaction products used in relatively small amounts in the order of, for example, 0.1 to 10 parts per 100 parts of rubber, are good flex-cracking inhibitors. They may be used with natural rubber and the synthetic diene rubbers, including the homopolymers and mixed polymers of conjugated dienes (e.g. butadiene, isoprene, dimethylbutadiene, etc.) and copolymers of these conjugated dienes with ethylenically unsaturated monomers such as styrene, methyl-substituted styrene, and other substituted styrenes, acrylonitrile, alkyl acrylates (such as methyl acrylate and alkyl-methacrylates such as methylmethacrylate), acrylonitrile, methacrylonitrile, vinyl pyridine, vinylidene cyanide, etc. These rubbers include NR, IR, SBR, NBR, etc.

In preparing the mixed sulfides, the reactants are dissolved in a mutual inert organic solvent, and the solution is preferably—although not necessarily—heated. The reaction is carried out at a temperature between room temperature and 140° C., the maximum being limited by the boiling point of the solvent. Heating is usually desirable not only to speed up the reaction, but also to maintain the reactants in solution. It is not necessary that the reaction product remain in solution. Solvents that can be used include benzene, toluene, the xylenes, etc. The reaction is carried out in the presence of a neutralizing agent for the hydrogen chloride liberated in the reaction, such as sodium hydroxide, potassium carbonate, sodium bicarbonate (and other alkali metal hydroxides, carbonates and bicarbonates), trimethylamine, etc.

The following examples are illustrative of the preparation of these reaction products:

EXAMPLE I

N-isopropyl-N'-phenyl-p-phenylenediamine (45.2 g.) (0.2 mol) and 2,2,4-trimethyl-6-dodecyl-1,2-dihydroquinoline (68.7 g.) (0.2 mol) were dissolved in 600 ml. benzene and the solution heated to 70° C. N,N'-diphenyl-p-phenylenediamine (52 g.) (0.2 mol) was then added and the resulting mixture stirred 30 minutes at 70° C. Sulfur dichloride (41.2 g.) (0.4 mol) dissolved in 150 ml. benzene was then added dropwise with stirring. Simultaneously a solution of sodium hydroxide (32 g.) (0.8 mol) dissolved in 150 ml. water was added dropwise with stirring. The temperature was maintained in the range 70–75° C. as follows:

|  | Elapsed Time, min. | Temperature, ° C. |
|---|---|---|
| At start of additions | 0 | 70 |
|  | 20 | 71 |
|  | 30 | 70 |
| At last addition | 40 | 70 |

The additions were complete in 40 minutes and the reaction mixture was stirred an additional 20 minutes at 70° C. The reaction mixture was then cooled, filtered and the aqueous layer was separated from the benzene layer. The benzene layer was washed with a solution of 35 g. sodium chloride in 150 ml. water. The washed benzene layer was then stripped of solvent until the final stripping conditions of 130° C. and 35 mm. pressure were obtained and held for 20 minutes. The product cooled to a viscous liquid; yield 159 g. (89.5%) (found 7.25% sulfur).

EXAMPLE II

N-cyclohexyl-N'-phenyl-p-phenylenediamine (26.6 g.) (0.1 mol) and 2,2,4-trimethyl-6-dodecyl-1,2-dihydroquinoline 68.7 g.) (0.2 mol) were dissolved in 600 ml. benzene and the solution heated to 70° C. N,N'-diphenyl-p-phenylenediamine (26 g.) (0.1 mol) was added and the resulting mixture stirred 30 minutes at 70° C. Sulfur dichloride (30.9 g.) (0.3 mol) dissolved in 150 ml. benzene was then added dropwise with stirring. Simultaneously a solution of sodium hydroxide (24 g.) (0.6 mol) dissolved in 150 ml. water was added dropwise with stirring. The temperature was maintained in the range 70–75° C. as follows:

|  | Elapsed Time, min. | Temperature, ° C. |
|---|---|---|
| At start of additions | 0 | 72 |
|  | 25 | 68 |
| At last addition | 50 | 70 |

The additions were complete in 50 minutes and the reaction mixture was stirred an additional 20 minutes at 70° C. The reaction mixture was then cooled, filtered and the aqueous layer was separated from the benzene layer. The benzene layer was washed with a solution of 35 g. sodium chloride in 150 ml. water. The washed benzene layer was then stripped of solvent until the final stripping conditions of 130° C. and 35 mm. pressure were obtained and held for 20 minutes. The product cooled to a brittle solid; yield 122.2 g. (93%) (found 7.6% sulfur).

EXAMPLE III

N,N'-di-sec butyl-p-phenylenediamine (44 g.) (0.2 mol) and 2,2,4-trimethyl-6-dodecyl-1,2-dihydroquinoline (68.7 g.) (0.2 mol) were dissolved in 600 ml. benzene. The solution was placed in a 2-liter 3-neck flask and heated to 70° C. with stirring. N,N'-diphenyl-p-phenylenediamine (52 g.) (0.2 mol) was added and the resulting mixture stirred 30 minutes at 70° C. Sulfur dichloride (41.2 g.) (0.4 mol) dissolved in 150 ml. benzene was then added dropwise with stirring. Simultaneously a solution of sodium hydroxide (32 g.) (0.8 mol) dissolved in 150 ml. water was added dropwise. The temperature was maintained in the range 70–75° C. as follows:

|  | Elapsed Time, min. | Temperature, ° C. |
|---|---|---|
| At start of additions | 0 | 69 |
|  | 30 | 67 |
| At last addition | 50 | 70 |

The additions were complete in 50 minutes and the reaction mixture was stirred an additional 20 minutes at 70° C. The reaction mixture was then cooled, filtered and the aqueous layer was separated from the benzene layer. The benzene layer was washed with a solution of 35 g. sodium chloride in 150 ml. water. The benzene layer was then stripped of solvent until the final stripping conditions of 130° C. and 35 mm. pressure were obtained and held for 20 minutes. The product cooled to a viscous liquid; 156.1 g. (88.5% yield) (found 7.53% sulfur).

The mixed sulfides of the various samples were compounded with the following masterbatch:

| | Parts by weight |
|---|---|
| Natural rubber | 100.0 |
| HAF Black | 50.0 |
| Zinc oxide | 3.0 |
| Extender | 3.0 |
| Stearic acid | 2.6 |
| Retarder | 1.0 |
| Total | 159.6 |

The resulting stocks, after adding 2.6 parts of sulfur and 0.5 part of accelerator (totaling 162.7 parts as given in the following table) and different amounts of the various reaction products of the examples (as given in the table), were cured 40 minutes at 280° F. The products were tested for their physical properties (both before and after oven aging in an air oven) and for flex-cracking resistance in a machine such as described in "Flex-Cracking Resistance" by L. V. Cooper in Industrial and Engineering Chemistry, Analytical Edition, 2, 391–4 (1930). In the flex-cracking test four cured strips of each stock were aged 1 day at 158° F., and then stretched 0 to 75 percent in a sidewall-flexing machine until one-half of the strips were broken (or for a maximum of 15 hours). The following table includes the record of (a) the number of strips broken, (b) the flex life which is the average number of hours both the broken and unbroken strips of a particular stock are flexed and (c) the cracks per hour which is the total number of cracks on all of the strips of a particular stock—both broken and not broken—divided by the average flex life.

The different stocks were also subjected to a crack initiation test, and the results of that test are recorded in the table. In that test a slab of the cured rubber stock is flexed repeatedly in a given area and then it is bent where it has been flexed and its surface examined to determine to what extent the flexing has cracked it.

Amount of inhibitor added to each sample stock is expressed in parts per hundred in the table. The control contained a commercially satisfactory flex-cracking inhibitor which, for each 100 parts of rubber polymer was 2.2 parts of 6-dodecyl-2,2,4-trimethyl-1,2-dihydroquinoline and 0.4 part of a fused mixture of 75 percent of N,N'-diphenyl-p-phenylenediamine and 25 percent 6-dodecyl-2,2,4-trimethyl-1,2-hydroquinoline. The modulus and tensile strength are expressed in pounds per square inch, and the elongation in percent.

Table 1

|  | Control | Stock A | Stock B | Stock C |
|---|---|---|---|---|
| Masterbatch | 162.7 | 162.7 | 162.7 | 162.7 |
| Commercial | 2.6 |  |  |  |
| Exampel I |  | 2.6 |  |  |
| Example II |  |  | 3.8 |  |
| Example III |  |  |  | 2.5 |
| Total | 165.3 | 165.3 | 166.5 | 165.2 |

PHYSICAL PROPERTIES 40' CURE AT 280° F.

| Normal: | | | | |
|---|---|---|---|---|
| 300% Modulus | 1,700 | 1,800 | 1,725 | 1,950 |
| Tensile strength (p.s.i.) | 3,875 | 3,950 | 3,875 | 3,950 |
| Percent elongation at break | 550 | 560 | 560 | 540 |
| Aged 2 Days at 212° F.: | | | | |
| 300% Modulus | 1,925 | 2,225 | 2,075 | 2,500 |
| Tensile strength (p.s.i.) | 2,700 | 2,950 | 2,950 | 3,000 |
| Percent elongation at break | 430 | 420 | 430 | 370 |
| Aged 96 Hrs. Oxygen Bomb at 158° F.: | | | | |
| 300% Modulus | 1,550 | 1,875 | 1,825 | 2,250 |
| Tensile strength (p.s.i.) | 2,900 | 3,300 | 3,200 | 3,350 |
| Percent elongation at break | 500 | 510 | 520 | 470 |
| Normal Crack Initiation Test (24 hrs. at 200° F.): | | | | |
| Block condition (4 blocks) | (¹) | Good | Good | (¹) |
| Relative rating in the series (1=best) | 2 | 1 | 1 | 2 |
| Sidewall Flexing Test (aged 1 day at 158° F.): | | | | |
| Number strips broken | 4 | 2 | 1 | 0 |
| Average flex life (hrs.) | 11.7 | 13.0 | 13.6 | |
| Number cracks formed per hr | 15.0 | 12.2 | 11.7 | 8.1 |

¹ Fair+ to good.

The table shows the cured test materials had good physical properties and that these stood up well on accelerated aging. Stock B which was made from relatively more of the dihydroquinoline derivative showed no trace of bloom.

In the crack initiation test, a rating of 1 is best. Stocks A and B had an excellent rating, better than the control to which 2.6 parts of a very good commercial flex-cracking inhibitor was added; and stock C although shown to be no better than the control in this test was very superior in the flex-cracking test. Each of the test stocks was much better than the control in the flex-cracking test.

The invention is covered in the claims which follow.

What I claim is:

1. The reaction product of (a) sulfur dichloride; (b) a diaryl arylenediamine of the class consisting of N,N'-diphenyl-p-phenylenediamine and mono- and dimethyl ring-substituted derivatives thereof; (c) a more soluble N,N'-disubstituted-p-arylenediamine of the class in which (1) the arylene group is from the class consisting of the phenylene, tolylene and ethylphenylene groups and (2) the amino substituents are from the class consisting of phenyl, biphenyl, tolyl, xylyl, naphthyl, cyclopentyl, cyclohexyl, and alkyl groups of 1 to 12 carbon atoms, provided however that no amino group contains more than one substituent of the class consisting of phenyl, biphenyl, tolyl, xylyl and naphthyl; and (d) a dihydroquinoline derivative of the class consisting of 2,2,4-trimethyl-1,2-dihydroquinoline and 6-substituted derivatives thereof in which the substituents are alkyl and alkoxy groups of 1 to 20 carbon atoms; the ratio of the reactants being 1 mol of said diaryl arylenediamine, to 1-2 mols of the more soluble arylenediamine, to 0.5-2 mols of the dihydroquinoline derivative, and a number of mols of the sulfur dichloride equal to one less than the total number of the mols of the other reactants; the reaction product being substantially free of hydrogen chloride and soluble in sulfur-cured diene rubber at concentrations at which said diaryl arylenediamine is insoluble.

2. The reaction product of claim 1 produced when reactant b is N,N'-diphenyl-p-phenylenediamine.

3. The reaction product of claim 1 produced when reactant d is 6-dodecyl-2,2,4-trimethyl-1,2-dihydroquinoline.

4. The reaction product of claim 1 produced from sulfur dichloride, N,N'-diphenyl-p-phenylenediamine, N-isopropyl-N'-phenyl-p-phenylenediamine and 6-dodecyl-2,2,4-trimethyl-1,2-dihydroquinoline.

5. The reaction product of claim 1 produced from sulfur dichloride, N,N'-diphenyl-p-phenylenediamine, N-cyclohexyl-N'-phenyl-p-phenylenediamine, and 6-dodecyl-2,2,4-trimethyl-1,2-dihydroquinoline.

6. The reaction product of claim 1 produced from sulfur dichloride, N,N'-diphenyl-p-phenylenediamine, N,N'-disec-butyl-p-phenylenediamine and 6-dodecyl-2,2,4-trimethyl-1,2-dihydroquinoline.

7. The process of curing a diene rubber which comprises heating the same with sulfur in the presence of a small amount of the reaction product of claim 1.

8. The process of curing a diene rubber which comprises heating the same with sulfur in the presence of a small amount of the reaction product of claim 1 produced from sulfur dichloride, N,N'-diphenyl-p-phenylenediamine, N-isopropyl-N'-phenyl-p-phenylenediamine and 6-dodecyl-2,2,4-trimethyl-1,2-dihydroquinoline.

9. The process of curing a diene rubber which comprises heating the same with sulfur in the presence of a small amount of the reaction product of claim 1 produced from sulfur dichloride N,N'-diphenyl-p-phenylenediamine, N-cyclohexyl-N'-phenyl-p-phenylenediamine and 6-dodecyl-2,2,4-trimethyl-1,2-dihydroquinoline.

10. The process of curing a diene rubber which comprises heating the same with sulfur in the presence of a small amount of the reaction product of claim 1 produced from sulfur dichloride, N,N'-diphenyl-p-phenylenediamine, N,N'-di-sec-butyl-p-phenylenediamine and 6-dodecyl-2,2,4-trimethyl-1,2-dihydroquinoline.

11. Sulfur-cured diene rubber which contains a small amount of the reaction product of claim 1.

12. Sulfur-cured natural rubber which contains a small amount of the reaction product of claim 1 in which reactant b is N,N'-diphenyl-p-phenylenediamine.

13. Sulfur-cured natural rubber which contains a small amount of the reaction product of claim 1 in which reactant d is 6-dodecyl-2,2,4-trimethyl-1,2-dihydroquinoline.

14. Sulfur-cured diene rubber which contains a small amount of the reaction product of claim 1 produced from sulfur-dichloride, N,N'-diphenyl-p-phenylenediamine, N-isopropyl-N'-phenyl-p-phenylenediamine and 6-dodecyl-2,2,4-trimethyl-1,2-dihydroquinoline.

15. Sulfur-cured diene rubber which contains a small amount of the reaction product of claim 1 produced from sulfur-dichloride, N,N'-diphenyl-p-phenylenediamine, N-cyclohexyl-N'-phenyl-p-phenylenediamine and 6-dodecyl-2,2,4-trimethyl-1,2-dihydroquinoline.

16. Sulfur-cured diene rubber which contains a small amount of the reaction product of claim 1 produced from sulfurdichloride, N,N'-diphenyl-p-phenylenediamine, N,N'-di-sec-butyl-p-phenylenediamine and 6-dodecyl-2,2,4-trimethyl-1,2-dihydroquinoline.

References Cited in the file of this patent

UNITED STATES PATENTS

| 1,956,248 | Parkes et al. | Apr. 24, 1934 |
| 2,281,968 | Zerweck et al. | May 5, 1942 |
| 2,342,137 | Gibbs | Feb. 22, 1944 |
| 2,381,771 | Paul | Aug. 7, 1945 |